United States Patent
Wang et al.

(10) Patent No.: US 9,912,660 B2
(45) Date of Patent: Mar. 6, 2018

(54) APPARATUS FOR AUTHENTICATING PAIRING OF ELECTRONIC DEVICES AND ASSOCIATED METHODS

(71) Applicant: Nokia Technologies Oy, Espoo (FI)

(72) Inventors: Kongqiao Wang, Helsinki (FI); Jiangwei Li, Beijing (CN); Yingfei Liu, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/903,361

(22) PCT Filed: Jul. 18, 2013

(86) PCT No.: PCT/CN2013/079582
§ 371 (c)(1),
(2) Date: Jan. 7, 2016

(87) PCT Pub. No.: WO2015/006950
PCT Pub. Date: Jan. 22, 2015

(65) Prior Publication Data
US 2016/0149905 A1    May 26, 2016

(51) Int. Cl.
*H04B 7/00* (2006.01)
*H04L 29/06* (2006.01)
(Continued)

(52) U.S. Cl.
CPC .......... *H04L 63/0861* (2013.01); *G06F 21/32* (2013.01); *G06K 9/00281* (2013.01);
(Continued)

(58) Field of Classification Search
None
See application file for complete search history.

(56) References Cited

U.S. PATENT DOCUMENTS 8,374,401 B2   2/2013   Sugimura et al.
9,083,658 B2 *  7/2015   Hawver ................. H04L 47/76
(Continued)

FOREIGN PATENT DOCUMENTS

CN    102027511 A    4/2011
CN    103155509 A    6/2013
WO    2011022247 A1   2/2011

OTHER PUBLICATIONS

International Search Report and Written Opinion received for corresponding Patent Cooperation Treaty Application No. PCT/CN2013/079582, dated May 6, 2014, 11 pages.

*Primary Examiner* — Tuan A Tran
(74) *Attorney, Agent, or Firm* — Alston & Bird LLP

(57) ABSTRACT

An apparatus comprising: a processor; and a memory including computer program code, the memory and the computer program code configured, with the processor, to cause the apparatus to perform at least the following: compare received biometric face vectors, wherein each received biometric face vector is received from a respective electronic device of a plurality of electronic devices and comprises one or more biometric face values determined from a respective image of a person captured by the corresponding electronic device; and provide for pairing authentication of the plurality of electronic devices if the comparison meets a predetermined similarity criterion.

20 Claims, 6 Drawing Sheets

881 — comparing received respective biometric face vectors, wherein each received respective biometric face vector is received from at least one of the respective electronic device of the multiple electronic devices; and comprises one or more biometric face values determined from a respective image of a user captured by the corresponding electronic device 882 — providing for pairing authentication of the multiple electronic devices if the comparison meets a predetermined similarity criterion.

(51) Int. Cl.
    *G06F 21/32*    (2013.01)
    *G06K 9/00*     (2006.01)
    *H04L 12/06*    (2006.01)
    *H04W 76/02*    (2009.01)

(52) U.S. Cl.
    CPC .......... *G06K 9/00288* (2013.01); *H04L 12/06* (2013.01); *H04W 76/023* (2013.01)

(56) References Cited

U.S. PATENT DOCUMENTS

| | | | |
|---|---|---|---|
| 9,229,955 B2* | 1/2016 | Salminen | G06K 9/00295 |
| 2011/0047384 A1* | 2/2011 | Jacobs | G06K 9/00677 |
| | | | 713/176 |
| 2013/0222627 A1* | 8/2013 | Earnshaw | H04N 5/23203 |
| | | | 348/211.2 |
| 2014/0013100 A1* | 1/2014 | Menzel | H04N 21/43637 |
| | | | 713/150 |
| 2014/0375428 A1* | 12/2014 | Park | G06K 7/10237 |
| | | | 340/10.1 |

* cited by examiner

Figure 7a

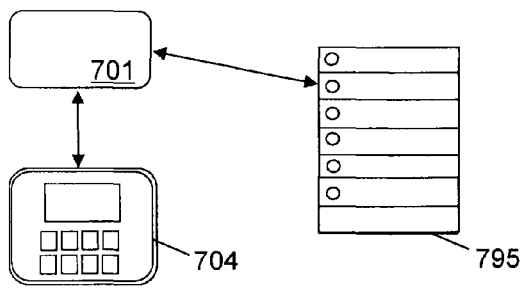

Figure 7b

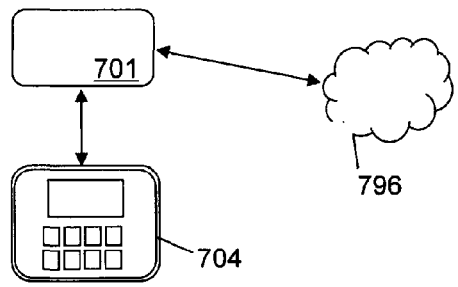

Figure 8

881 — comparing received respective biometric face vectors, wherein each received respective biometric face vector is received from at least one of the respective electronic device of the multiple electronic devices; and comprises one or more biometric face values determined from a respective image of a user captured by the corresponding electronic device 882 — providing for pairing authentication of the multiple electronic devices if the comparison meets a predetermined similarity criterion.

Figure 9

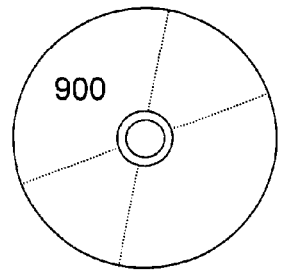

APPARATUS FOR AUTHENTICATING PAIRING OF ELECTRONIC DEVICES AND ASSOCIATED METHODS

RELATED APPLICATION

This application was originally filed as Patent Cooperation Treaty Application No. PCT/CN2013/079582 filed Jul. 18, 2013.

TECHNICAL FIELD

The present disclosure relates to the field of electronic device pairing, associated methods, computer programs and apparatus. Certain disclosed aspects/examples relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/example embodiments may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

Many electronic devices are configured to enable data to be transferred from one electronic device to another. For example, users may use email to transfer data (e.g. textual or image data) from one electronic device to another. Other electronic devices allow communication channels to be established to allow data to be transmitted in real-time. For example, a mobile telephone is configured to enable communication channels to be established to one or more other mobile telephones to allow telephone calls to be made. Data can be transmitted in this way using wireless or wired communication channels.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
 a processor; and
 a memory including computer program code,
 the memory and the computer program code configured, with the processor, to cause the apparatus to perform at least the following:
 compare received biometric face vectors, wherein each received biometric face vector is itself received from a respective electronic device of a plurality of electronic devices and comprises one or more biometric face values determined from a respective image of a person captured by the corresponding electronic device; and
 provide for pairing authentication of the plurality of electronic devices if the comparison meets a predetermined similarity criterion.

It will be appreciated that it is the respective biometric face vectors which are received from the respective electronic devices.

Pairing may be considered to be a process used in computer networking that helps set up a communications channel between computing devices to allow communications between them. The communications may be unidirectional (i.e. allowing data to be transmitted from a first device to a second device but not from the second device to the first device); bidirectional (e.g. where data can be transmitted between two devices in either direction). Pairing may also encompass establishing a communications network between two or more electronic devices to allow data to be shared. The pairing may determine (e.g. limit) the data which can be transmitted (e.g. a particular pairing connection may be limited to particular files or particular types of data such as image or textual data).

The apparatus may be configured such that the pairing authentication is based on biometric face vectors determined from respective images captured within a predetermined time window. For example, each of the images may be time stamped and/or each of the biometric face vectors may comprise time information which is used in the comparison to determine whether the images were captured within a certain predetermined time window (e.g. less than 5 seconds to 10 minutes).

One or more of the images may comprise a photograph or a frame of a video.

A biometric face vector may be considered to be a series of biometric face values which characterise (e.g. to identify) a face. Each biometric face value forming part of a biometric face vector may be considered to describe a particular parameter of a person's face (e.g. the size of the person's mouth; the colour of their hair; the roundness of their eye's etc.)

Biometric face vectors may represent one or more of: the components of a particular model face determined to correspond to the person's face image; the size of facial features of the person; the colour of facial features of the person; and the distance between the facial features of the person (e.g. distance between the eyes, distance between the eyes and mouth). It will be appreciated that other values may be derived from these parameters. For example, an example embodiment may use the ratio of the distance between the eyes and between the eyes and mouth as a biometric face value.

The person may be the user of one or more electronic devices of the plurality of electronic devices. The person may be the subject of an image captured by one or more electronic devices of the plurality of electronic devices.

The apparatus may be configured to compare other biometric vectors/values in addition to the biometric face vectors. Other biometric vectors/values may represent one or more of body characteristics (e.g. height, shoulder width) and hand characteristics (e.g. fingerprint information).

The respective biometric face vectors may be shared by collecting the biometric face vectors from the plurality of electronic devices at one of the plurality of electronic devices. It will be appreciated that if one of the plurality of electronic devices is configured to carry out the comparison and to authenticate the pairing, a remote server may not be required. This may allow pairing to be authenticated between electronic devices which can communicate with each other but not with a remote server (e.g. between mobile phones where a Bluetooth pairing connection between the phones can be established, but cellular network reception is unavailable).

The respective biometric face vectors may be shared by exchanging the biometric face vectors (i.e. rather than, for example, exchanging the image data from which the biometric face vectors are determined) between the plurality of electronic devices.

The respective biometric face vectors may be shared by transmitting the biometric face vectors to a remote server. It will be appreciated that, in this case, the server may carry out the comparison of the biometric face vectors in order to authenticate pairing.

The sharing may be performed using one or more of: a Bluetooth connection; an internet connection; a wireless connection; a wired connection; a near field communication connection and a radio-frequency connection.

The apparatus may comprise a camera configured to capture an image of the person. The apparatus may be configured to comprise a display configured to display the captured image of the person.

The apparatus may be configured:
in response to detecting the same person's face on the plurality of electronic devices, enable pairing based on respective detected images of the detected person's face.

The apparatus may be one of the electronic devices, a cloud computer, or a server.

The apparatus may be one of the plurality of electronic devices, a portable electronic device, a laptop computer, a mobile phone, a Smartphone, a tablet computer, a personal digital assistant, a digital camera, a watch, a server, a non-portable electronic device, a desktop computer, a monitor, a server, a wand, a pointing stick, a touchpad, a touchscreen, a mouse, a joystick or a module/circuitry for one or more of the same.

According to a further aspect of the present disclosure, there is provided a method, the method comprising:
comparing received respective biometric face vectors, wherein each received respective biometric face vector is received from an electronic device of a plurality of electronic devices and comprises one or more biometric face values determined from a respective image of a person captured by the corresponding electronic device; and
providing for pairing authentication of the plurality of electronic devices if the comparison meets a predetermined similarity criterion.

According to a further aspect of the present disclosure, there is provided a computer program comprising computer program code, the computer program code being configured to perform at least the following:
compare received biometric face vectors, wherein each received biometric face vector is received from a respective electronic device of a plurality of electronic devices and comprises one or more biometric face values determined from a respective image of a person captured by the corresponding electronic device; and
provide for pairing authentication of the plurality of electronic devices if the comparison meets a predetermined similarity criterion.

According to a further aspect of the present disclosure, there is provided a system comprising a first electronic device and a second electronic device, the first and second electronic devices configured to generate respective biometric face vectors from respective images of persons captured by the corresponding electronic devices, and wherein the first electronic device, the second electronic device or an apparatus in communication with the first and second electronic devices is configured to compare received biometric face vectors from respective first and second electronic devices to provide for pairing authentication of the first and second electronic devices if the comparison meets a predetermined similarity criterion.

The apparatus in communication with the first and second electronic devices may be a server/cloud computer.

According to a further aspect of the present disclosure, there is provided an apparatus comprising:
a processor; and
a memory including computer program code,
the memory and the computer program code configured, with the processor, to cause the apparatus to perform at least the following:
authenticate pairing between a plurality of electronic devices based on a comparison of shared respective biometric face vectors, wherein each respective biometric face vector comprises one or more biometric face values determined from a respective image of a person captured by the corresponding electronic device.

In a further aspect there is provided an apparatus, the apparatus comprising:
means for comparing configured to compare received biometric face vectors, wherein each received biometric face vector is received from a respective electronic device of a plurality of electronic devices and comprises one or more biometric face values determined from a respective image of a person captured by the corresponding electronic device; and
means for providing configured to provide for pairing authentication of the plurality of electronic devices if the comparison meets a predetermined similarity criterion.

The present disclosure includes one or more corresponding aspects, examples or features in isolation or in various combinations whether or not specifically stated (including claimed) in that combination or in isolation. Corresponding means and corresponding functional units (e.g. comparator, provider) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIGS. 7a-7b illustrate an example apparatus according to the present disclosure in communication with a remote server/cloud;

FIG. 8 illustrates a flowchart according to a method of the present disclosure; and FIG. 9 illustrates schematically a computer readable medium providing a program.

DESCRIPTION OF EXAMPLE ASPECTS

Figure 1:
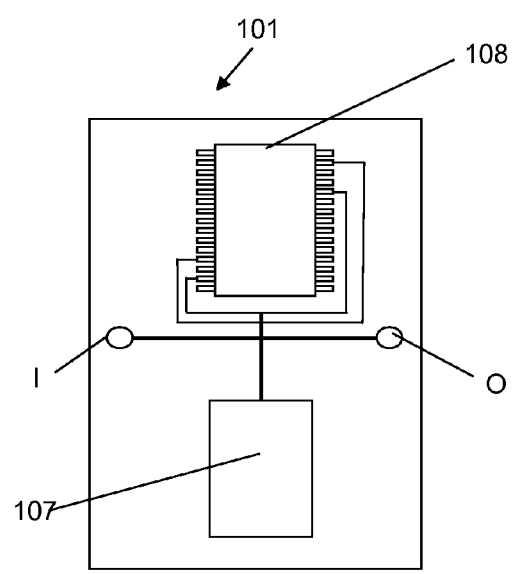
FIG. 1 illustrates an example apparatus embodiment comprising a number of electronic components, including memory and a processor, according to one example embodiment of the present disclosure.

It is common to pair devices in order to share data between electronic devices. In general for ad hoc pairing some form of authentication is required to ensure the security of the electronic devices (e.g. to prevent data from being stolen, or to prevent electronic devices being infected with viruses or other malware). This is particularly important for portable electronic devices where a user may be unaware of what devices are within pairing range of their electronic device.

Previously password protection has been used to authenticate pairing connections. However, this may require users to remember multiple different passwords to maintain security (e.g. one for each pairing connection, or one for each pairing device). The present disclosure relates to using biometric face vectors to authenticate pairing between a plurality of electronic devices. By using biometric face vectors, the user who wishes to establish pairing may not need to remember password data whilst still providing robust security. Furthermore, as it is the biometric face vectors that are used to authenticate the pairing (i.e. rather than transmitting image data), the amount of data required to be shared between the plurality of electronic devices may be minimised.

Other example embodiments depicted in the figures have been provided with reference numerals that correspond to similar features of earlier described example embodiments. For example, feature number 1 can also correspond to numbers 101, 201, 301 etc. These numbered features may appear in the figures but may not have been directly referred to within the description of these particular example embodiments. These have still been provided in the figures to aid understanding of the further example embodiments, particularly in relation to the features of similar earlier described example embodiments.

FIG. 1 shows an apparatus 101 comprising memory 107, a processor 108, input I and output O. In this example embodiment only one processor and one memory are shown but it will be appreciated that other example embodiments may utilise more than one processor and/or more than one memory (e.g. same or different processor/memory types).

In this example embodiment the apparatus 101 is an Application Specific Integrated Circuit (ASIC) for a portable electronic device with a touch sensitive display. In other example embodiments the apparatus 101 can be a module for such a device, or may be the device itself, wherein the processor 108 is a general purpose CPU of the device and the memory 107 is general purpose memory comprised by the device.

The input I allows for receipt of signalling to the apparatus 101 from further components, such as components of a portable electronic device (like a touch-sensitive or hover-sensitive display) or the like. The output O allows for onward provision of signalling from within the apparatus 101 to further components such as a display screen, speaker, or other output device. In this example embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
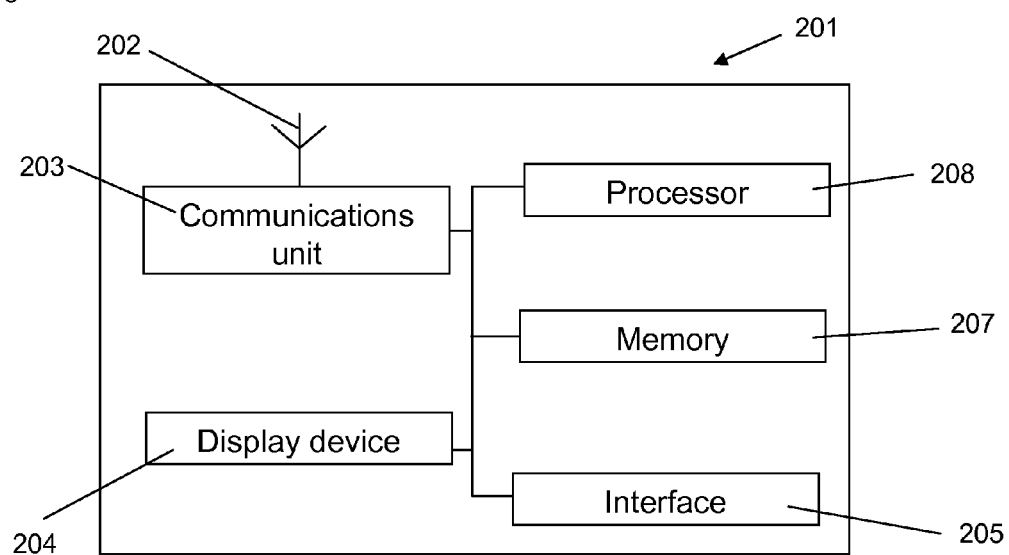
FIG. 2 illustrates an example apparatus embodiment comprising a number of electronic components, including memory, a processor and a communication unit, according to another example embodiment of the present disclosure.

FIG. 2 depicts an apparatus 201 of a further example embodiment, such as a mobile phone. In other example embodiments, the apparatus 201 may comprise a module for a mobile phone (or PDA or audio/video player), and may just comprise a suitably configured memory 207 and processor 208.

The example embodiment of FIG. 2 comprises a display device 204 such as, for example, a liquid crystal display (LCD), e-Ink or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
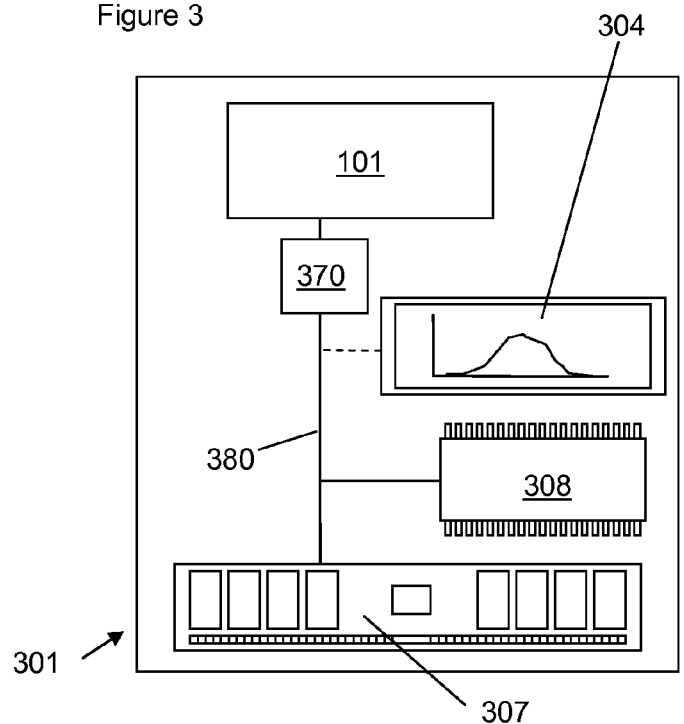
FIG. 3 illustrates an example apparatus embodiment comprising a number of electronic components, including memory and a processor, according to another example embodiment of the present disclosure.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touch-sensitive or otherwise) that provides information from the apparatus 101 to a user. Display 304 can be part of the device 301 or can be separate. The device 301 also comprises a processor 308 configured for general control of the apparatus 101 as well as the device 301 by providing signalling to, and receiving signalling from, other device components to manage their operation.

The storage medium 307 is configured to store computer code configured to perform, control or enable the operation of the apparatus 101. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4A:
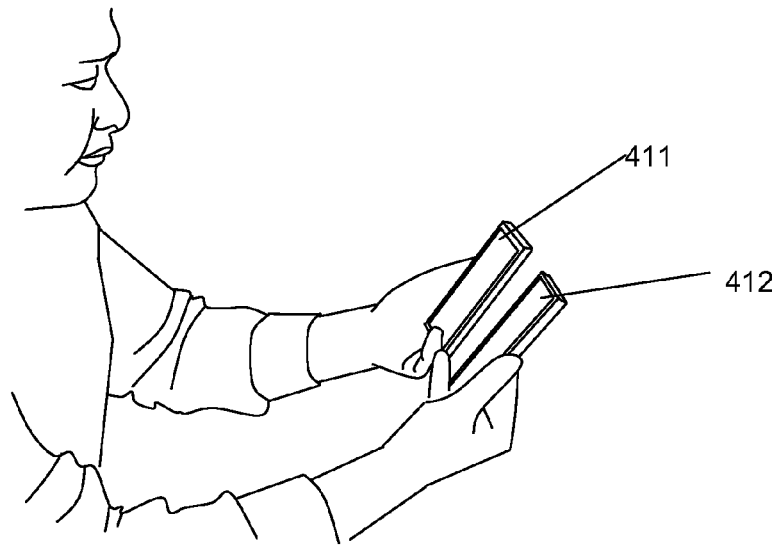
FIGS. 4a-4d illustrate an example embodiment configured to authenticate pairing between two mobile phone electronic devices.

FIG. 4a shows a person interacting with his mobile phone 411 (a first portable electronic device) and his wife's mobile phone 412 (a second portable electronic device) which he wishes to pair in order to synchronize calendars. In this case, each of the first and second portable electronic devices 411, 412 is equipped with a front facing camera (not shown). In the situation shown in FIG. 4a, where the person is looking at both phone electronic devices 411, 412 simultaneously, the person's face is within the field of view of each electronic device's 411, 412 front facing camera.

In this case, the first electronic device 411 is configured to: compare received biometric face vectors, wherein each received biometric face vector is received from a respective electronic device of a plurality of electronic devices and comprises one or more biometric face values determined from a respective image of a person captured by the corresponding electronic device; and provide for pairing authentication of the plurality of electronic devices if the comparison meets a predetermined similarity criterion. It will be appreciated that the second electronic device 412 could provide for the comparison and pairing in other embodiments. It will be appreciated that, in this case, the person whose images is being used to authenticate the pairing of the electronic device is the user of the devices.

Figure 4B:
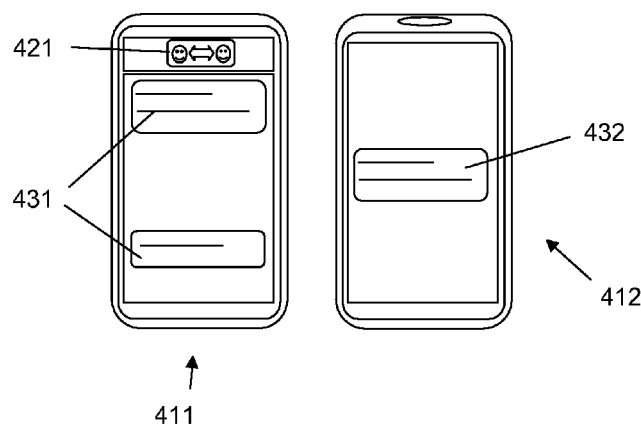

FIG. 4b shows the screens of the two electronic devices 411, 412 when the person is initiating the pairing in order to synchronise calendars. At this stage, the person's first (phone) electronic device 411 is configured to show: the person's appointments 431 for the day within the calendar application; and a synchronise icon 421 configured to allow the person to synchronise the portable electronic device 411 with compatible electronic devices within the vicinity. Similarly, in this example, the second electronic device 412 (the phone of the person's wife) is showing the person's wife's appointments 432 for the same day. In this example, the user wishes to synchronise the calendar entries 431, 432 so that both the user and his wife can see what appointments are in each other's schedule. To initiate this process, the user presses the synchronise icon 421 which enables the devices to be paired in order to share data, in this case, via a Bluetooth communication channel.

Figure 4C:
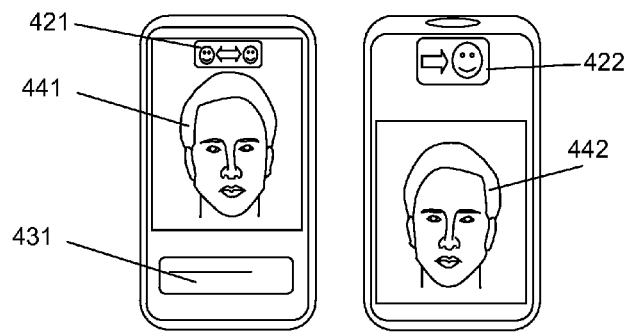

The screens of the two portable electronic devices when the synchronise icon 421 is selected is shown in FIG. 4c. In response to the synchronise icon 421 being selected, the first portable electronic device 411 is configured to activate the front facing camera and capture a first image 441 (e.g. picture or photograph) of the (user) person's face. The captured first image 441 is shown in the screen and corresponding first biometric face vector, $V_1$, is generated. Other example embodiments may be configured to allow the user to capture a further image (e.g. if the image is misaligned) or confirm that the captured image is acceptable. In addition, the person's portable electronic device 411 is configured to broadcast a pairing request to other electronic devices in the vicinity. It will be appreciated that other example embodiments may allow the user to specify the devices to which the pairing request is transmitted.

As shown in FIG. 4c, the pairing request has been received by the second portable electronic device 412 (the phone of the person's wife). In response to the pairing request being received, the second portable electronic device is configured to activate its front facing camera and capture a second image 442 of the person's face. In addition, a confirm-pairing icon 422 is displayed showing that a pairing request has been received. In this example, the device/apparatus is configured, when the confirm-pairing icon 422 is selected, to enable authentication of the pairing of the plurality of electronic devices 411, 412. The (user) person wishes to continue pairing the first and second electronic devices 411, 412 so selects the confirm-pairing icon (e.g. by pressing or hovering over the icon).

In response to the confirm-pairing icon 422 being selected, the second portable electronic device 412 is configured to determine a second biometric face vector, $V_2$, corresponding to the image 442 of the (user) person captured by the second portable electronic device.

In this case the second portable electronic device determines the second biometric face vector, $V_2$, by processing the captured image to determine the position of a predetermined selection of key features of the face (e.g. the position of the eyes, nose, mouth and chin). Using these determined positions of the key features, the second portable electronic device is configured to determine a number of predetermined biometric face values which form at least part the biometric face vector.

For example, in this case, the second portable electronic device is configured to determine a biometric face value for: the colour of the eyes; the separation between the eyes; the curvature or shape of the chin; and the distance between the eyes and the chin. When the biometric face vector comprising these biometric face values has been determined, the biometric face vector is transmitted to the first electronic device 411. It will be appreciated that transmitting the biometric face vector itself (comprising a limited number of biometric face values) may be quicker than transmitting the image itself (because the amount of data to be transmitted may be smaller).

As mentioned above, in this example embodiment, the first electronic device 411 is configured to determine the same parameters for the image 441 captured by the first electronic device to form a first biometric face vector, $V_1$. It will be appreciated that some example embodiments may be configured to determine which biometric face values to determine based on a received biometric face vector. For example, if a received biometric face vector included a biometric face value for eye colour, the receiving apparatus/device may be configured to determine a respective eye colour biometric face value to enable a comparison between the values to be made.

In this example, the first portable electronic device/apparatus 411 is then configured to compare the determined first biometric face vector, $V_1$, and the received second biometric face vector, $V_2$ (determined and provided by the second portable electronic device), and if the comparison meets a predetermined similarity criterion, provide for pairing authentication of the first and second electronic devices 411, 412. For example, the similarity criterion may require that each of the biometric face values is within a certain range of each other (e.g. $0.9 \times V_2$(eye separation)$<V_1$(eye separation)$\leq 1.1 \times V_2$(eye separation) etc.) It will be appreciated that the criteria may have different requirements for each biometric face value.

In this case, the first biometric face vector, $V_1$, and the second biometric face vector, $V_2$, meet the predetermined similarity criterion and so the first and second electronic devices 411, 412 are paired. In this case, as part of the comparison, the first electronic device 411 is configured to determine whether the images 441, 442 corresponding to the respective biometric face vectors were captured within a predetermined time window (e.g. within 5 minutes). That is, if the comparison indicated that the images had not been taken within this predetermined time window, the first portable electronic device would not authenticate pairing between the plurality of electronic devices.

Figure 4D:
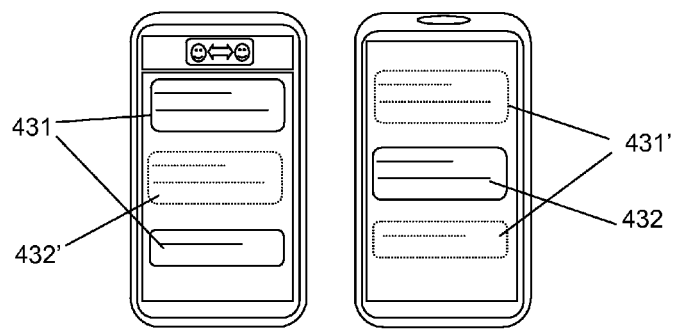

When the first and second electronic devices 411, 412 are paired, the respective calendars of the first and second electronic devices 441, 412 can be synchronised by transmitting the appointment data between the multiple paired devices. This is shown in FIG. 4d: the calendar of the first portable electronic device now comprises appointment information 432' from the calendar of the second portable electronic device; and the calendar of the second portable electronic device now comprises appointment information 431' from the calendar of the first portable electronic device.

In this example, because the images 441, 442 corresponding to the face vectors are captured under similar environmental conditions (e.g. the imaging characteristics including illumination characteristics such as lighting level, lighting colour, lighting direction will be similar), the comparison between the two face vectors may be more robust. This means that two images of the same face should result in very similar determined face vectors. This may allow the similarity criterion to be set so as to be more precise thereby increasing the reliability and security of the device pairing.

It will be appreciated that by matching the facial characteristics in this way, each of the biometric face vectors are determined extemporaneously. This may be more secure than pre-registering a person's biometric face vectors beforehand.

It will be appreciated that, in other example embodiments, the biometric face vectors may be determined for one or more images corresponding to frames of a video.

It will be appreciated that other example embodiments may be configured to transmit the biometric face vectors between the plurality of electronic devices using near field communication (NFC) channels.

Figure 5A:
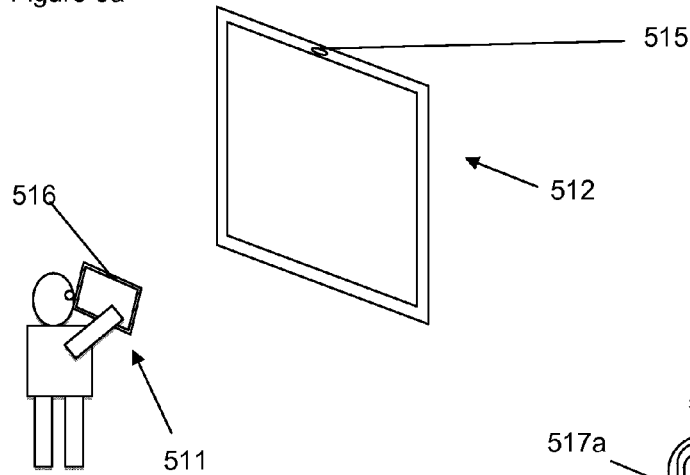
FIGS. 5a-5d illustrate an example embodiment configured to authenticate pairing between two mobile phone electronic devices.

FIG. 5a shows a person interacting with a first electronic device such as a tablet computer 511 which he wishes to pair with a television 512 (a second electronic device) in order to control the television 512 using the tablet computer 511. This will allow the person to play music stored on the first (tablet computer) electronic device 511 on the second (television) electronic device 512. In this case, each of the first (tablet computer) electronic device 511 and the second (television) electronic device 512 is equipped with a camera 515, 516. In the situation shown in FIG. 5a, the person is within the field of view of the cameras 515, 516 of the first and second electronic devices 511, 512 simultaneously.

In this case, the second (television) portable electronic device 512 is configured to: compare received biometric face vectors, wherein each received biometric face vector is itself received from a respective electronic device of a plurality of electronic devices and comprises one or more biometric face values determined from a respective image of a person captured by the corresponding electronic device; and provide for pairing authentication of the plurality of electronic devices if the comparison meets a predetermined similarity criterion. It will be appreciated that, in this case, the person whose image is being used to authenticate the pairing of the devices is the user of the devices.

Figure 5B:
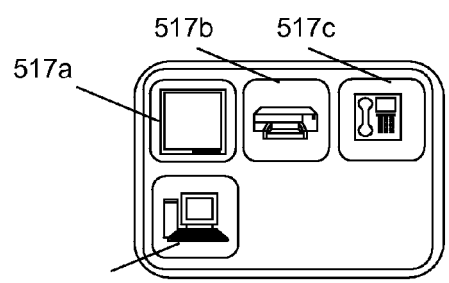

FIG. 5b shows the screen of the first (tablet computer) electronic device 511 when the person is initiating the pairing in order use the first electronic device 511 to control the second electronic device 512. In this case, the first electronic device 511 is configured to allow the user to select which device or devices they would like to be paired. To select which devices to pair, the user has navigated to a pairing screen configured to display a number of icons 517 corresponding to the electronic devices which can be paired with the first (tablet computer) electronic device. In this case, the first electronic device is configured to pair with other electronic devices using a wireless internet connection. There are a number of pairable devices detected including the second (television) electronic device 517a, a printer 517b, a phone 517c and a desktop computer 517d.

In this case, the user selects the television pairing icon 517a corresponding to the second electronic device.

Figure 5C:
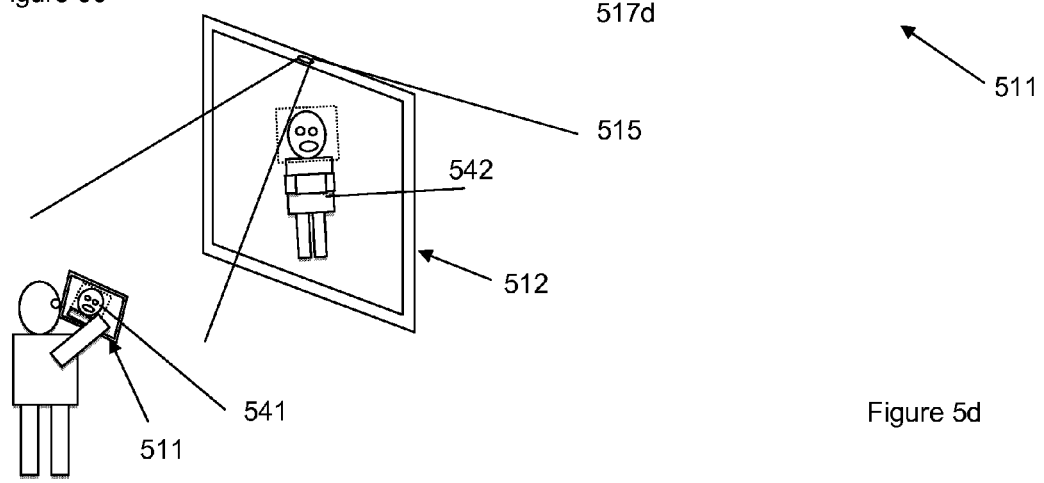

In response to the television pairing icon 517a being selected, the first portable electronic device 511 is configured to activate the front facing camera 516 and take an image of the person's face 541. This is shown in FIG. 5c. The captured first image 541 may be shown in the screen.

In this case the first electronic device is configured to process the first image 541 to determine the shape of the face. The device then determines the components (or proportions) of a set of predetermined faces (or eigenfaces)

which when combined would correspond to the shape of the person's face (as determined from the captured image). These components or proportions represent the biometric face values making up the biometric face vector. For example, the person's face may correspond to: 54% of predetermined face 1; 55% of predetermined face 2; and −9% of predetermined face 3.

Biometric face vector creation may be implemented (e.g. by an apparatus and/or electronic device) by:
- performing face detection on the whole image to find a face candidate (e.g. to recognise where the face is positioned within the image);
- locating one or more facial key points on the detected face which are then used to normalise the detected face to a predefined standard size; and
- converting the normalised face to a vector (e.g. into a long vector by concatenating all image columns into one); and
- projecting the vector onto all predetermined faces to compute the projection components (biometric face values).

Each of these projection components correspond to the proportion of a respective predetermined face. By doing this, the dimensionality of the detected face may be reduced for recognition. In addition, this process may help reduce noise contained in the original detected face image.

After the first biometric face vector has been determined, the first (tablet computer) electronic device 511 is configured to unicast a pairing request and the first biometric face vector to the selected electronic device (or devices), which in this case is the second (television) electronic device 512.

When pairing request has been received by the second electronic device 512, the second electronic device 512 is configured to activate its camera 515 and capture an image 542 of the person including the person's face (also shown in FIG. 5c). The second electronic device is then configured to determine a second biometric face vector, $V_2$, corresponding to the second image of the person 542 captured by the second portable electronic device 512. In this example embodiment, the second electronic device 512 is configured to determine the same parameters for the image 542 captured by the second electronic device to form a second biometric face vector.

The second (television) electronic device/apparatus 512 is configured to compare the received determined first biometric face vector (determined by the first portable electronic device) and the determined second biometric face vector and if the comparison meets a predetermined similarity criterion, provide for pairing authentication of the first and second electronic devices 511, 512.

In this case, the first biometric face vector and the second biometric face vector meet the predetermined similarity criterion and so the first and second electronic devices are paired. In this case, as part of the comparison, the first electronic device is configured to determine whether the images corresponding to the respective biometric face vectors were captured within a predetermined time window (e.g. within 30 seconds). That is, if the comparison indicated that the images had not been captured within this predetermined time window, the second portable electronic device would not authenticate pairing between the plurality of electronic devices.

Figure 5D:
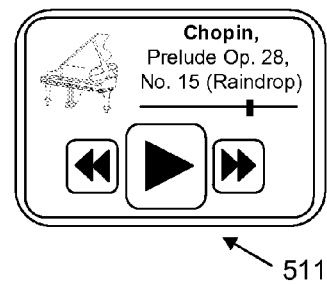

When the first and second electronic devices 511, 512 are paired, the first device can stream data, such as audio data, to be played using the second electronic device. FIG. 5d shows the screen of the first electronic device when the two electronic devices have been paired. When streaming audio data from the first (tablet computer) electronic device to the paired second (television) electronic device, the screen of the first electronic device is configured to display a number of user interface elements to allow the user to control the output of the audio data on the second electronic device (e.g. to skip tracks, and to pause and play the audio tracks).

It will be appreciated that, in other example embodiments, the biometric face vectors may be determined for one or more images corresponding to frames of a video.

Figure 6A:
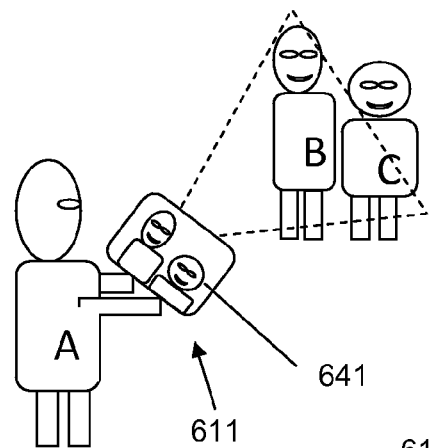
FIGS. 6a-6c illustrate an example embodiment configured to authenticate pairing between two mobile phone electronic devices.

FIG. 6a shows a person, A, interacting with a first electronic device 611 such as digital camera to capture a photographic image 641 of two friends, B and C. When the photographic image 641 has been captured, friend B wishes to obtain the photographic image on his mobile telephone 612 (a second electronic device shown in FIG. 6b).

Figure 6B:
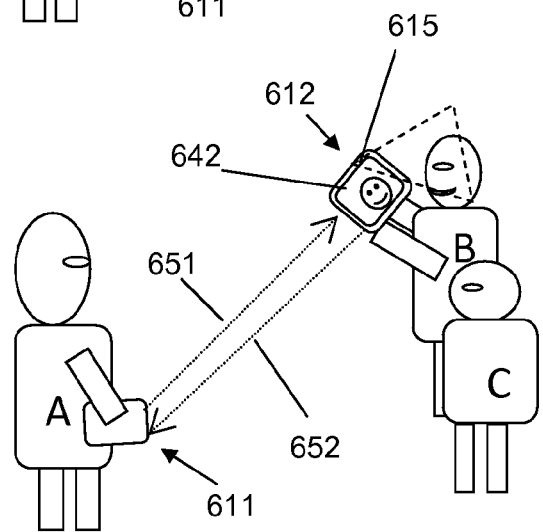

To pair the electronic devices 611, 612 of persons A and B, the first electronic device 611 is configured to determine the biometric face vectors of B and C from the captured image 641, and broadcast an image sharing request 651 (in this case via Bluetooth). This is shown in FIG. 6b.

Person B wants to check the photographic image. He accepts the Bluetooth request 651 on his mobile telephone 612 (second electronic device). Then the front camera 615 of the second electronic device is launched automatically, and an image 642 of person B is captured. The captured image may be shown on the screen. The biometric face vector is determined from this image, and is itself transmitted 652 back to Device A (as shown in FIG. 6b). In this case, to determine the biometric face vector, the second electronic device is configured to process the image to determine the shape of the face. The device then determines the components (or proportions) of a set of predetermined faces (e.g. eigenfaces or face eigenvectors) which when combined would correspond to the shape of the person's face (as determined from the captured image). These components or proportions represent the biometric face values making up the biometric face vector. After the second biometric face vector has been determined, the second electronic device 612 is configured to transmit 652 the second biometric face vector to the first electronic device 611.

In this case, the first (digital camera) portable electronic device 611 is configured to: compare received biometric face vectors, wherein each received biometric face vector is received from a respective electronic device of a plurality of electronic devices and comprises one or more biometric face values determined from a respective image of a person captured by the corresponding electronic device; and provide for pairing authentication of the plurality of electronic devices if the comparison meets a predetermined similarity criterion. It will be appreciated that in other example embodiments the comparison and/or authentication of the pairing may be performed at a remote server (i.e. remote from any of the plurality of electronic devices to be paired). In this case, the person whose images are being used to authenticate pairing is the user of the second (mobile telephone) electronic device, and the subject of an image taken by the first electronic device.

That is, in this case, when the first electronic device 611 receives the second biometric face vector from the second electronic device, the first electronic device 611 compares the received biometric face vector with the biometric face vectors determined from the photographic image of the two friends 641. If the comparison meets a predetermined similarity criterion, the first electronic device is configured to provide for the pairing authentication of the first and second electronic devices.

In this case, the first biometric face vector and the second biometric face vector meet the predetermined similarity criterion and so the first and second electronic devices 611, 612 are paired.

Figure 6C:
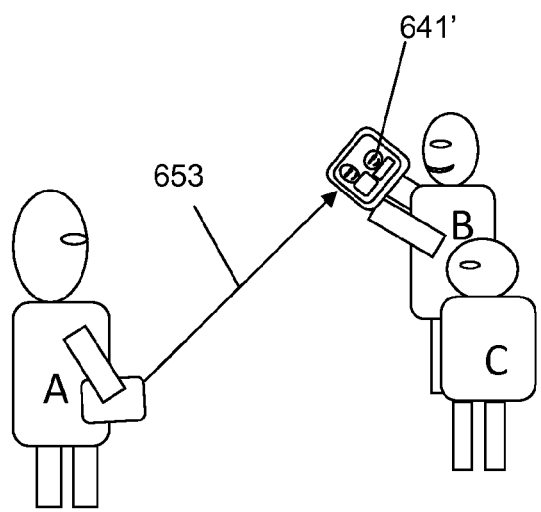

When the first and second electronic devices 611, 612 are paired, the first electronic device 611 is enabled to transmit data (e.g. photographs) to the second electronic device 612. FIG. 6c shows the situation when person B has received the photograph 641' from the first electronic device 611 and is displaying the photograph 641' on the second electronic device. It will be appreciated that, in other example embodiments, pairing may also allow data to be transferred from the second electronic device to the first electronic device.

It will be appreciated that, in other example embodiments, the biometric face vectors may be determined for one or more images corresponding to frames of a video.

FIG. 7a shows an example of an apparatus 701 in communication with a remote server. FIG. 7b shows an example of an apparatus 701 in communication with a "cloud" for cloud computing. In FIGS. 7a and 7b, apparatus 701 (which may be apparatus 101, 201 or 301) is also in communication with a further apparatus 704. The apparatus 702 may be display screen, mobile phone, laptop or personal digital assistant, for example. In other examples, the apparatus 701 and further apparatus 702 may both be comprised within a device such as a portable communications device or PDA. Communication may be via a communications unit, for example.

FIG. 7a shows the remote computing element to be a remote server 795, with which the apparatus 701 may be in wired or wireless communication (e.g. via the internet, Bluetooth, NFC, a USB connection, or any other suitable connection as known to one skilled in the art). In FIG. 7b, the apparatus 701 is in communication with a remote cloud 796 (which may, for example, be the Internet, or a system of remote computers configured for cloud computing). For example, the apparatus performing the comparison and/or the pairing authentication may be located at a remote server 795 or cloud 796 and accessible by the first apparatus 701. In other examples the second apparatus may also be in direct communication with the remote server 795 or cloud 796.

FIG. 8 shows a flow diagram illustrating the steps of comparing 881 received respective biometric face vectors, wherein each received respective biometric face vector is received from an electronic device of a plurality of electronic devices and comprises one or more biometric face values determined from a respective image of a person captured by the corresponding electronic device; and providing 882 for pairing authentication of the plurality of electronic devices if the comparison meets a predetermined similarity criterion.

FIG. 9 illustrates schematically a computer/processor readable medium 900 providing a program according to an example. In this example, the computer/processor readable medium is a disc such as a digital versatile disc (DVD) or a compact disc (CD). In other examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

It will be appreciated that other example embodiments may be a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a processor; and
a memory including computer program code,
the memory and the computer program code configured, with the processor, to cause the apparatus to perform at least the following:
comparing received respective biometric face vectors, wherein each received biometric face vector is received from a respective electronic device of a plurality of electronic devices and comprises one or more biometric face values determined from a respective image of a person captured by the corresponding electronic device, the received biometric face vector created by performing face detection and converting the detected face to a vector; and
providing for pairing authentication of the plurality of electronic devices if the comparison meets a predetermined similarity criterion.

2. The apparatus of claim 1, wherein the pairing authentication is based on biometric face vectors determined from respective images captured within a predetermined time window.

3. The apparatus of claim 1, wherein one or more of the images comprise a photograph or a frame of a video.

4. The apparatus of claim 1, wherein each of the respective biometric face vectors represents one or more of:
components of a particular model face determined to correspond to a person's face image;
size of facial features of the person;
color of facial features of the person; or
distance between the facial features of the person.

5. The apparatus of claim 4, wherein the respective biometric face vectors are shared by collecting the biometric face vectors from the plurality of electronic devices at one electronic device of the plurality of electronic devices.

6. The apparatus of claim 1, wherein the respective biometric face vectors are shared by exchanging the biometric face vectors between the plurality of electronic devices.

7. The apparatus of claim 1, wherein the respective biometric face vectors are shared by transmitting the biometric face vectors to a remote server.

8. The apparatus of claim 7, wherein the respective biometric face vectors are shared by transmitting the biometric face vectors to the remote server using one or more of: a Bluetooth connection; an internet connection; a wireless connection; a wired connection; a near field communication connection; or a radio-frequency connection.

9. The apparatus of claim 1, wherein the apparatus is configured to capture an image of the person.

10. The apparatus of claim 1, wherein the apparatus is configured:
in response to detecting a same person's face on the plurality of electronic devices, enable pairing based on respective detected images of the detected same person's face.

11. The apparatus of claim 1, wherein the pairing authentication enables at least one of the captured images to be shared among the plurality of electronic devices.

12. The apparatus of claim 1, wherein the apparatus is one of the plurality of electronic devices; or a server.

13. The apparatus of claim 1, wherein the apparatus is a portable electronic device, a laptop computer, a mobile phone, a smartphone, a tablet computer, a personal digital assistant, a digital camera, a watch, a server, a non-portable electronic device, a desktop computer, a monitor, a server, a wand, a pointing stick, a touchpad, a touch-screen, a mouse, a joystick or a module/circuitry for one or more of the same.

14. A method comprising:
comparing received respective biometric face vectors, wherein each received respective biometric face vector is received from an electronic device of a plurality of electronic devices and comprises one or more biometric face values determined from a respective image of a person captured by the corresponding electronic device, the received biometric face vector created by performing face detection and converting the detected face to a vector; and
providing for pairing authentication of the plurality of electronic devices if the comparison meets a predetermined similarity criterion.

15. The method of claim 14, wherein the pairing authentication is based on biometric face vectors determined from respective images captured within a predetermined time window.

16. The method of claim 14, wherein the biometric face vectors represent one or more of:
components of a particular model faces determined to correspond to a person's face image;
size of facial features of the person;
color of facial features of the person; or
distance between the facial features of the person.

17. The method of claim 14, wherein the respective biometric face vectors are shared by exchanging the biometric face vectors among the plurality of electronic devices.

18. The method of claim 14, wherein the respective biometric face vectors are shared by transmitting the biometric face vectors to a remote server.

19. The method of claim 14, further comprising:
in response to detecting a same person's face on the plurality of electronic devices, enabling pairing based on respective detected images of the detected same person's face.

20. A computer program product comprising non-transitory computer readable medium comprising computer program code, the computer program code comprising instructions that, when executed by a processor, configure the processor to:
compare received biometric face vectors, wherein each received biometric face vector is received from a respective electronic device of a plurality of electronic devices and comprises one or more biometric face values determined from a respective image of a person captured by the corresponding electronic device, the received biometric face vector created by performing face detection and converting the detected face to a vector; and
provide for pairing authentication of the plurality of electronic devices if the comparison meets a predetermined similarity criterion.

* * * * *